(12) United States Patent
Hwang et al.

(10) Patent No.: US 6,671,265 B1
(45) Date of Patent: Dec. 30, 2003

(54) METHOD FOR OPTIMIZING HARD HANDOFFS IN CDMA NETWORK

(75) Inventors: Yun-Seok Hwang, Seoul (KR); Pyeong-Hwan Wee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/250,661

(22) Filed: Feb. 16, 1999

(30) Foreign Application Priority Data

Feb. 17, 1998 (KR) .............................................. 98-4682

(51) Int. Cl.[7] .............................. H04Q 7/20; H04Q 7/00
(52) U.S. Cl. ........................ 370/331; 370/332; 370/335; 455/424; 455/67.11; 455/436
(58) Field of Search .................. 455/424, 67.11, 455/67.14, 436, 440, 442; 370/331, 332, 335

(56) References Cited

U.S. PATENT DOCUMENTS

| | | | | |
|---|---|---|---|---|
| 5,548,808 A | * | 8/1996 | Bruckert et al. ........... 455/33.2 |
| 5,559,806 A | * | 9/1996 | Kurby et al. .............. 370/95.3 |
| 5,737,705 A | | 4/1998 | Ruppel et al. .............. 455/452 |
| 5,822,686 A | | 10/1998 | Lundberg et al. ......... 455/161.3 |
| 5,859,839 A | | 1/1999 | Ahlenius et al. ............. 370/252 |
| 5,926,470 A | * | 7/1999 | Tiedemann et al. ......... 370/334 |
| 5,930,711 A | * | 7/1999 | Kim et al. ................... 455/436 |
| 6,075,989 A | * | 6/2000 | Moore et al. ............... 455/436 |
| 6,157,838 A | * | 12/2000 | Di Huo et al. ............. 455/439 |
| 6,188,900 B1 | * | 2/2001 | Ruiz et al. .................. 455/436 |
| 6,266,529 B1 | * | 7/2001 | Chheda ...................... 455/436 |

* cited by examiner

Primary Examiner—Vivian Chin
Assistant Examiner—Eugene Yun
(74) Attorney, Agent, or Firm—Dilworth & Barrese, LLP

(57) ABSTRACT

Disclosed is a method for optimizing hard handoffs, e.g., between Mobile Switching Centers in a CDMA network. In the method, preliminary conditions for a hard handoff test are first set up. Idle handoffs are then performed in a hard handoff area, log data for the idle handoffs is analyzed and adjustments to communication equipment are made accordingly. Next, hard handoff tests are conducted in a traffic state in the hard handoff area. Log data of the hard handoff tests are analyzed and further adjustments to communication equipment are made if hard handoff performance during the hard handoff tests is determined to be unsatisfactory. A final hard handoff confirmation test is then performed in the hard handoff area following the latter communication equipment adjustments.

15 Claims, 4 Drawing Sheets

FIG. 1

| CAR AVERAGE SPEED IN URBAN AREA | T_TDROP | SEC | CAR'S MOVING DISTANCE DURING THE TIMER PERIOD |
|---|---|---|---|
| 45 | 3 | 4 | 50 |
| 45 | 2 | 2 | 25 |

|  | OPTIMIZATION TEST | COMMERCIALIZATION TEST | FINAL TRANSFER TEST |
|---|---|---|---|
| HARD HANDOFF (SAMSUNG) | 90% AND ABOVE | 92% AND ABOVE | 95% AND ABOVE |
| HARD HANDOFF (OTHER PROVIDER) | 85% AND ABOVE | 90% AND ABOVE | 93% AND ABOVE |

METHOD FOR OPTIMIZING HARD HANDOFFS IN CDMA NETWORK

BACKGROUND OF THE INVENTION

1. Technical Field

The present invention generally to wireless telecommunications and more particularly to a method for optimizing hard handoffs between Mobile Switching Centers in a Code Division Multiple Access (CDMA) network.

2. Description of the Related Art

Handoff is the act of transferring control of a mobile station from one base station (BTS) to another. In CDMA systems, handoff determinations are typically made based on signal strength measurements by mobile stations of pilot signals transmitted by respective base stations. If the measured pilot signal strength of a present base station (presently communicating with the mobile station) falls below a threshold, the mobile station transmits a Pilot Strength Measurement Message (PSMM). The traffic channel which received the PSMM forwards it to a transceiver and selector bank (TSB) of a base station controller (BSC). The base station controller determines what type of handoff should be performed.

CDMA handoffs are classified into three types. The first type is known as a soft handoff, which is a call state in which two or more base stations support a mobile station. A soft handoff usually occurs when a mobile station travels from one cell to another cell serviced by the same BSC, where the base station of the second cell uses the same frequency assignment as the first. The second type is known as a "softer" handoff, which is performed when a mobile station moves from one angular sector to another angular sector in the same BTS service area.

The third type of handoff, hard handoff, is an abrupt handoff in which the mobile station is not controlled simultaneously by two or more base stations. Unlike soft or softer handoffs, the call link connected to the mobile station is not always maintained during hard handoff; instead, it is cut off and re-established in a very short time frame. Hard handoff can occur either between mobile switching centers (MSCs), between frequency assignments, or between frame offsets. Hard handoffs are usually performed between same-protocol systems, but can also be performed between systems of different protocols, such as from a CDMA system to an analog Advanced Mobile Phone System (AMPS). Hard handoffs from CDMA to CDMA systems are categorized into: handoffs between base stations (or MSCs) of different manufacturers; handoffs between channels with different frame offsets; and handoffs between different frequency assignments. During an inter-MSC hard handoff, when a mobile station moves to a cell serviced by a neighboring MSC, the MSC is switched and the vocoder is reassigned.

Handoff parameters used to evaluate handoff are defined as follows:

T_ADD—a threshold value for a pilot-to-interference ratio (PIR). When the PIR of a pilot from a particular base station is measured by a mobile station to be higher than T_ADD, then the mobile transmits a message to the communication network to report the detection of that pilot. The base station that transmitted the pilot will then be added to a set of base stations that are candidates for accepting a handoff. The actual value of the threshold T_ADD is a parameter that the mobile obtains from the overhead messages broadcast by the base stations. If T_ADD is decreased, the handoff coverage area increases, the capacity decreases and the quality improves through diversity gain, since more traffic channels are available for soft handoff.

T_DROP—a threshold value for a pilot-to-interference ratio which will result in dropping a base station from a list of possible candidates for accepting a handoff. If the value of T_DROP is increased, the handoff coverage area decreases, capacity increases and quality is diminished.

T_COMP—a threshold parameter determinative of where a hard handoff can occur with respect to a target cell. If T_COMP is reduced, hard handoff occurs a farther distance away from the target cell, resulting in a higher probability of failure and an increase in the hard handoff ping-pong phenomenon (and vice versa if T_COMP is increased).

Guard timer—a guard timer which is similar to the T_TDROP parameter (discussed below) is managed by the Call Control Processor (CCP) or the Call Control Block (CCOX) to alleviate the hard handoff ping pong phenomenon. Hard handoff is not performed until the guard timer period has elapsed.

Guard level—a threshold signal add strength level. Though the guard timer has already started timing, if the strength (Ec/Io) of the pilot received by the mobile station is −12 dB or below, a hard handoff is performed before the guard timer period is complete.

T_TDROP—a timing interval during which hard handoff is performed. FIG. 1 is a table showing a mobile station's travel distance according to T_TDROP values for the case of a BTS servicing an urban area. As shown, when the mobile station travels 50 m during a four second interval (corresponding to T_TDROP=3), about 10% of the BTS coverage area of a typical 500 m long coverage area is traversed. Therefore, in an urban area where a number of active sets exist and the RF environment rapidly changes during short distances, the proper T_TDROP value for fast adaptation will be four seconds or less.

Tx_ATTEN—the attenuation value of a base station transmit attenuator controlling base station transmit power. The final output (or power) variable of the BTS per traffic channel is the Tx_ATTEN value of the transceiver unit associated with that traffic channel. The output of the BTS can be changed as much as the Tx_ATTEN value, which is set when the input level to the transceiver is constant. The shadow area, the handoff area, and the link balance may be adjusted by varying TX_ATTEN. These three values are adjusted by remote control of the base station its manager (BSM) or by using a map from the BTS.

Antenna direction (azimuth) adjustment—adjusting the antenna direction in azimuth changes the coverage area. When adjusting the antenna direction, the following conditions must be considered: 1) if the antenna is located in front of a building and the beam points to the building, the progress of the radio wave will be hindered; 2) reflections off bodies of water, e.g., rivers or lakes, may produce higher interference levels in desolate areas; 3) the antenna beam is affected by a lossy propagation medium, such as a park with many trees; 4) an area with low signal level and heavy communication traffic may be adjacent another area with less traffic and higher signal level relative to the amount of traffic.

Antenna tilt (elevation)—when adjusting the antenna beam direction in elevation, the following conditions must be considered: 1) when the antenna is located atop a tall building, the main lobe of the antenna beam may not point to the ground area proximate the lower part of the building, resulting in low signal levels thereat; 2) when the antenna has no tilt in a hilly area, it produces an interference signal to other base stations.

Conventionally, to achieve a specified signal level in a designated coverage area and/or to adequately transmit signals into a shadow area, the BTS transceiver power is first adjusted. If such adjustment fails to produce acceptable coverage in the coverage area or to resolve the shadow area problem, the antenna beam may be adjusted in azimuth or elevation. It is noted that a shadow area can be determined by a low Received Signal Strength Indicator (RSSI) measurement or by a low Ec/Io (signal to interference ratio) measurement in a particular area.

Techniques for improving call service based on signal strength measurements or handoff statistics have been described. For instance, U.S. Pat. No. 5,737,705 describes a method for improved frequency assignment based on handoff statistics taken to and away from a base station. U.S. Pat. No. 5,822,686 relates to signal strength measurements taken on varying radio channels to provide information to the system for channel allocation and handoff decisions.

At present, the soft and softer handoff techniques have been proven to exhibit superior call quality to hard handoff methods in terms of call failure rates and the like. Thus, there is a need for a way to improve the reliability of hard handoffs, particularly for those occurring between mobile switching centers (inter-MSC handoffs).

SUMMARY OF THE DISCLOSURE

It is an object of the present invention to provide an optimization method for inter-MSC hard handoffs so as to enhance the total network quality.

In one aspect of the present invention, there is provided a method for optimizing hard handoffs in a Code Division Multiple Access (CDMA) network, e.g., between Mobile Switching Centers. In the method, preliminary conditions for a hard handoff test are first set up. Idle handoffs are then performed in a hard handoff area, log data for the idle handoffs is analyzed and adjustments to communication equipment are made accordingly. Next, hard handoff tests are conducted in a traffic state in the hard handoff area. Log data of the hard handoff tests are analyzed and further adjustments to communication equipment are made if hard handoff performance during the hard handoff tests is determined to be unsatisfactory. A final hard handoff confirmation test is then performed in the hard handoff area following the latter communication equipment adjustments.

The adjustments to the communication equipment to improve the hard handoff success rate may include: adjustments to the base station RF transmit power in the control channel or pilot channel, adjustments to the base station antenna beam in azimuth and/or elevation (tilt), and adjustments to base station software.

BRIEF DESCRIPTION OF THE DRAWINGS

The above and other objects, features and advantages of the invention will become more apparent from the following detailed description of a preferred embodiment thereof, taken in conjunction with the accompanying drawings in which like reference numerals denote like elements, wherein:

FIG. 1 is a table illustrating a distance traveled by a mobile station during a guard timer period;

DETAILED DESCRIPTION OF THE PREFERRED EMBODIMENTS

An illustrative embodiment of a method for optimizing inter-MSC hard handoffs in accordance with the invention will now be described. The method involves performing handoff tests and then modifying various handoff parameters which affect the probability of success for subsequent handoffs. Briefly, the optimization method includes the following steps:

1. Preliminary conditions for hard handoff tests are established;
2. Idle handoffs in a hard handoff area are performed;
3. Log data from the idle handoffs are analyzed, and adjustments made accordingly;
4. Hard handoffs in the traffic state in the hard handoff area are performed;
5. If hard handoffs fail, log data for the hard handoffs are analyzed and further adjustments are made accordingly;
6. A final hard handoff confirmation test is performed.

Figure 2:
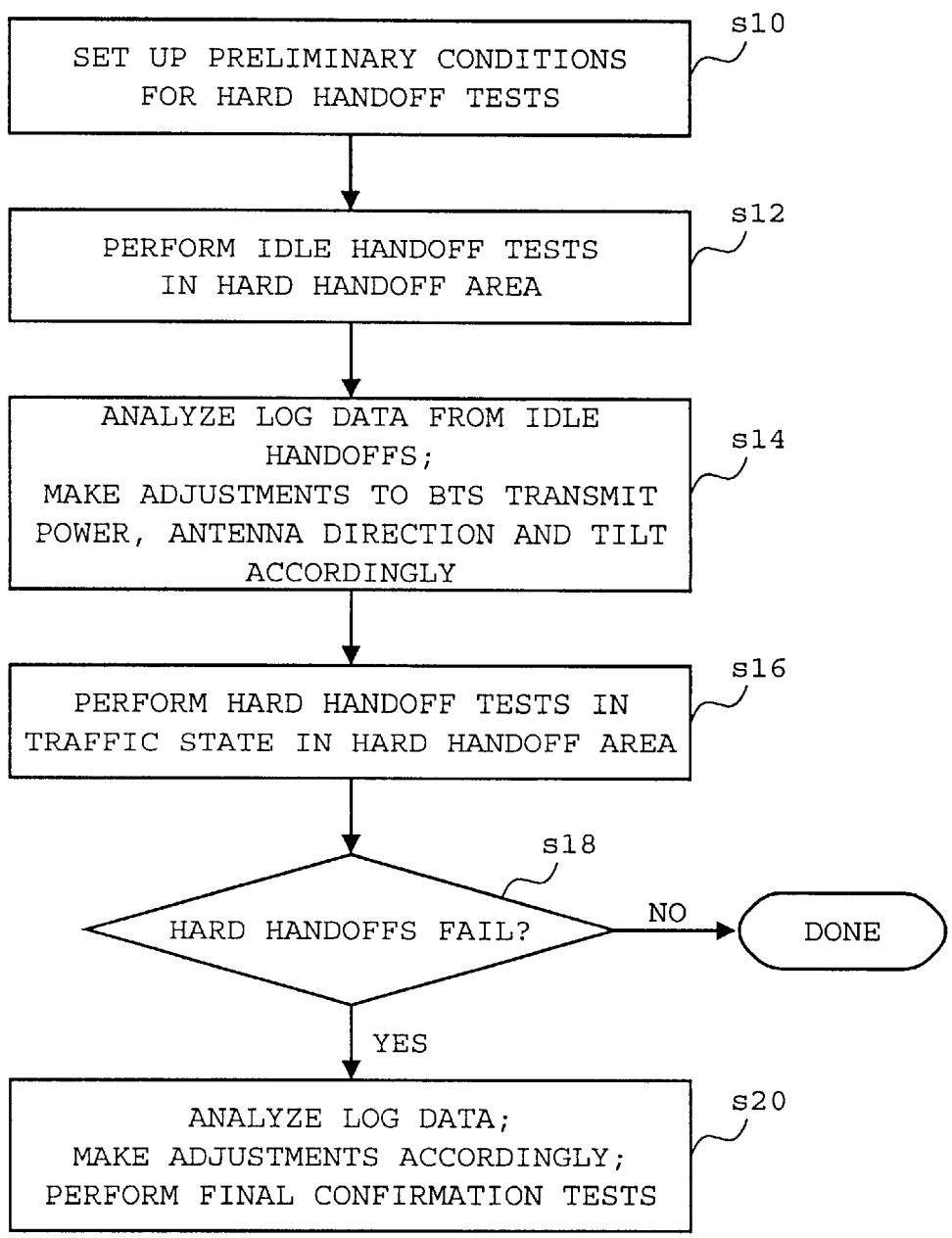
FIG. 2 is a flow chart of an illustrative hard handoff optimization method in accordance with the invention.
Figure 3:
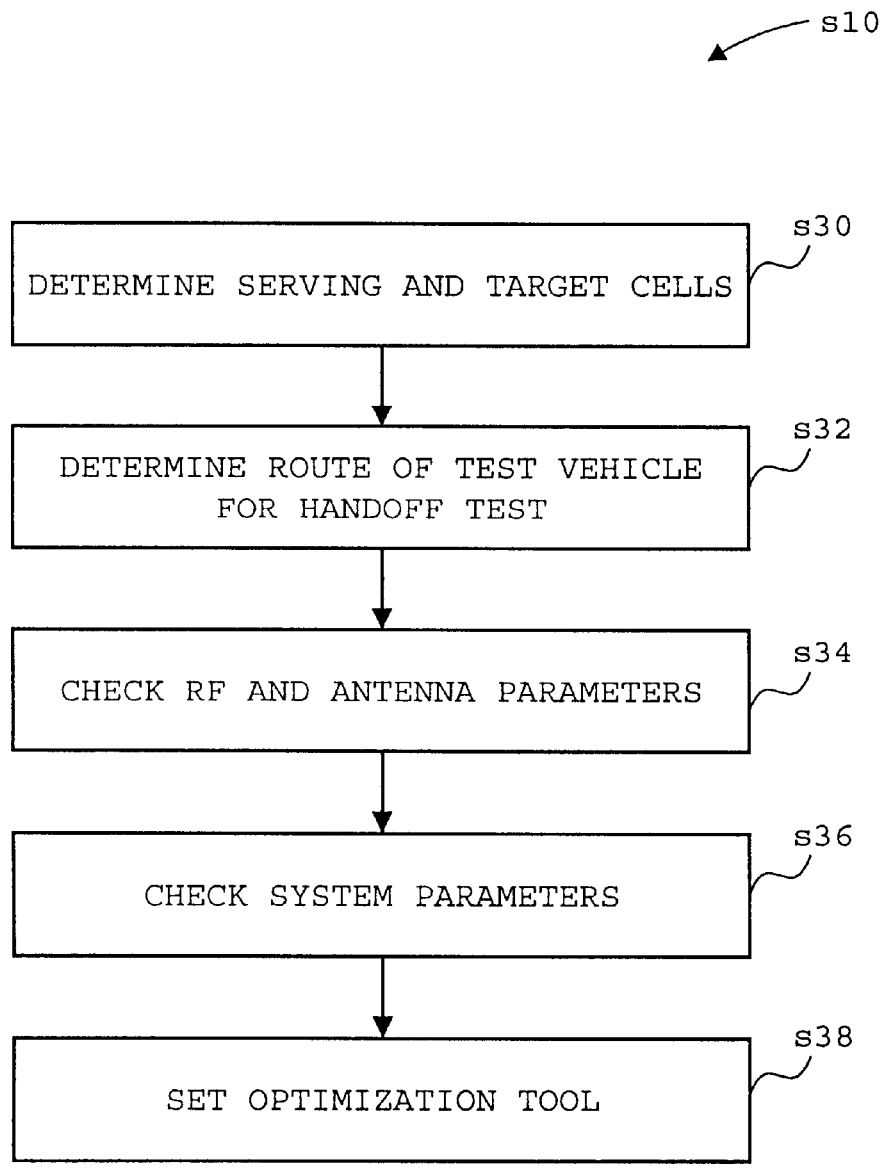
FIG. 3 is a flow chart of a preliminary set up procedure of the method of FIG. 2.

Referring to FIG. 2, a flow chart of the illustrative optimization method is depicted. The method begins in step S10, where preliminary conditions for the hard handoff tests are set up. The details of step S10 are illustrated in the flow chart of FIG. 3. The serving cell and the target cell to perform the inter-MSC hard handoffs are determined and fixed in step S30. The route of a test vehicle performing the inter-MSC hard handoff test is determined in step S32. Note that a communication session with a mobile phone in the test vehicle is to be handed off from one MSC to another during the test. The route is preferably a principal road such as a highway. The probability of successful inter-MSC hard handoffs is higher when the test is performed in an area covered by the peak of the main lobe of the antenna. Therefore, curved roads, hills and tunnels should be avoided.

In step S34, RF parameters including the RF transmit power of the BTS is checked. In addition, the antenna azimuth direction and tilt are checked. Next, in step S36 a check is performed on the system parameters. This step includes checks on:

i) handoff parameters (e.g., T_ADD, T_DROP, T_COMP, T_TDROP);
ii) the state of the guard timer and the guard level, i.e., whether or not the guard timer and guard level are to be used;
iii) whether or not the BTS of the serving cell and the BTS of the target cell are omitted from a neighboring base station list provided from the base station manager (BSM); and
iv) the state of the target BTS cluster (the state of alarm of the BTS and the trunk). This check is performed through the BSM.

Lastly, for the preliminary set-up procedure, in step S38, an optimization tool is set. In this procedure, a pseudorandom noise (PN) offset value is inputted to a file in a mobile diagnostic monitor (MDM). The mobile station parameters including the Electronic Serial Number (ESN), the vocoder rate (=13K) and the class band (=4) are also checked. Further, a detailed map of the test cluster and the surroundings is obtained.

Returning to FIG. 2, following the preliminary set-up, idle handoffs in a hard handoff area are performed (step S12). When a mobile station is in the idle state, it is not engaged in active communication in a traffic channel. Instead, it receives a message on the paging channel if an incoming call is being attempted. Idle handoff is the act of transferring reception of the paging channel from one base station to another when the mobile station is in the idle state.

One purpose of the idle handoff test of step S12 is to verify that a suitable amount of RF power from the base station is reaching the hard handoff area. In an exemplary embodiment, the receiving level is maintained between −75 to −80 dBm. The idle handoff test with the test vehicle is preferably performed a number of times in opposite directions along the route. The resulting log data is obtained using the mobile diagnostic monitor.

The log data from the idle handoffs is analyzed in step S14. For the forward link, the log data includes entries for both the pilot to interference ratio Ec/Io and the mobile receiving power in the handoff area. Exemplary threshold values for these parameters are: −14 dB for Ec/Io, −95 dBm and −90 dBm for mobile receiving power in a suburban area and urban area, respectively. For the reverse link, it is determined from the log data if the mobile transmitting power is +10 dBm and over. If the respective test results are below the above-noted reference values, then the Tx_ATTEN of the BTS, the antenna azimuth direction and/or the antenna tilt are adjusted to improve the signal strength in the handoff area.

Following the adjustments, hard handoff tests in the traffic state in the hard handoff area are carried out (step S16). A number of handoff tests with the test vehicle traveling in opposite directions are conducted to sample the handoff success rate. If, in step S18, the number of hard handoff failures are excessive, log data associated with the handoffs is analyzed in step S20. Otherwise, no further adjustments to the antenna beam, the BTS transmit power, etc., are necessary.

In step S20 the data between the BTS and the mobile station in the forward link and reverse link are compared and analyzed. The forward link data is received through the MDM; the reverse link data is checked from the BSM. Based on the log data, the reason for each call drop or call failure is categorized as one or a combination of the following: RF environment; inadequate parameter optimization (e.g., transmit power level too low, incorrect handoff parameter set-up, neighbor list and/or search window size); infrastructure issue; subscriber issue; and, operational issue. An RF environment problem can be caused by excessive path loss due to poor coverage and lack of a dominant server (i.e., a BTS in which a dominant signal strength is detected by a mobile station in the corresponding area); delay spread; or rapid change of the pilot.

The reason for the dropped call can be any of the following:

A) In the Forward Link:
1) Improper setting for the overhead channel power level and the traffic channel power thresholds.
2) Improper handoff parameter setting.
3) Removing the pilot from the active set by the candidate set before the replacement.
4) Pilot is too weak to lock the code tracking loop.
5) Distortion of the forward signal by the power amplifier.
6) Improper control of the forward channel power.
7) High Frame Error Rate (FER), poor pilot, or poor RSSI.

B) In the Reverse Link:
1) Improper setting of the access parameters, improper setting of the open loop power control, or improper setting of the reverse link Eb/No threshold value.
2) A number of signaling conditions cause the system to revert to the system determination state of the initiated system setting.
3) Maximized handset power and poor link quality.
4) Unsuitable pilot during the handoff operation.
5) Poor performance of the forward link power control channel.
6) Link imbalance.
7) High FER, frequent change in the transmit gain, and high transmit power.

C) Possible Software Problems Causing the Call Drop/Failure:
1) An updated neighbor list was not received. After a successful inter-MSC hard handoff, a message carrying an updated neighbor list of the target cell must be received—if the list is not received, a call drop occurs. In accordance with the present embodiment, this problem is solved by applying a supplementary package to the BTS software (i.e., updating the software) to prevent call drops due to this condition.
2) The guard timer is not properly working. After a successful forward channel inter-MSC hard handoff, the time until the associated reverse channel inter-MSC hard handoff occurs is restricted in order to prevent the ping pong phenomena. In accordance with the present embodiment, when analyzing the message, if the above-noted time is shorter than a preset value (e.g., 5 seconds), a supplementary package is applied.
3) An improper message is received while performing the hard handoff. For example, after receiving the "mobile station reject order", the call is dropped. In accordance with the present embodiment, an improper message of this sort is indicative of a mobile station problem or a software problem, whereupon appropriate corrective measures are taken.
4) After performing the hard handoff, the call is not audible and then the call is dropped. In accordance with the present embodiment, this condition is determined to be a mobile station problem, whereupon corrective action is effectuated.

D) Environmental Problem Causing Call Drop/Failure

The cause of the call drop/failure may be an RF environmental problem, e.g., excessive path loss or delay spread, which results in low signal strength in the inter-MSC handoff area. When peforming hard handoff under the condition of a prior signal from the serving cell, the serving cell signal gradually worsens because the mobile station is moving towards the target cell. In this situation, if the mobile station fails to receive the signal provided by the serving cell BTS, the hard handoff towards the target cell cannot be performed, and becuase the FER increases, the call is dropped. In accordance with the embodiment, this condition can be remedied by adjusting the transmit power of the BTS, the antenna direction, and/or the antenna tilt. The optimized signal strength (Ec/Io) in the service cell of the inter-MSC hard handoff is −10~−7 dB.

Referring still to FIG. 2, once adjustments are made in step S20 to remedy the cause of the handoff failure, a final confirmation test in the hard handoff area is performed. This test involves conducting a number of hard handoff attempts along the same route as in the previous test, and counting the number of successful and failed handoffs to arrive at an overall success rate.

Figures 4, 5:
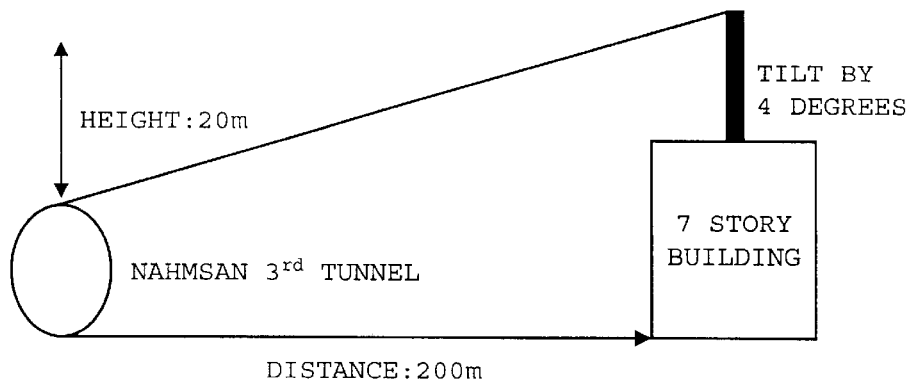
FIG. 4 is a table illustrating a comparison of success rates for hard handoffs.
FIG. 5 illustrates an example of optimization the inter-MSC hard handoff in a tunnel according to the present invention.

FIG. 4 illustrates a comparison of hard handoff success rates for two sets of base station equipment (Samsung equipment and equipment of another service provider), during an optimization test, a commercialization test and a final transfer test. As shown, the success rates for the final transfer test, after adjustments as described above were made, are improved relative to the optimization test.

The following optimization examples are presented to further illustrate applications of the present invention.

OPTIMIZATION EXAMPLE 1

Sep. 23, 1997; KTF Kwangjin-gu Area in Seoul

Objective: improve the signal strength in front of the Kid Amusement Park (the front gate of the Sejong University).

Adjustment: adjusting the antenna direction of the Joong-gok BTS $\beta$ sector and the Sungsoo BTS $\alpha$ sector. For the Joong-gok $\beta$; direction: −180 degree; tilt: electrical 2 degrees and mechanical 2 degrees.

Results: The receiving level in front of the Kid Amusement Park is maintained between −75~−80 dBm, thereby boosting the RF signal strength to increase probability of success of the hard handoff.

OPTIMIZATION EXAMPLE 2

Oct. 1, 1997; Hansol PCS, Mapo way in Seoul

In the Mapo way section (from Dowha to Ah-hyun), a strong Dowha $\alpha$ sector signal (−9 dBm) is received from the surroundings of the Ah-hyun BTS. Therefore, the tilt of the $\beta$ antenna of the Ah-hyun BTS is adjusted by +6 degrees upward, and the tilt of the a antenna of the Dowha BTS is adjusted by −6 degrees downward. As a result, the probability of success of the inter-MSC hard handoff is improved by 85%.

OPTIMIZATION EXAMPLE 3

Oct. 1, 1997; Hansol PCS, Mahnleejae way in Seoul

There exist a number of mixed signals around the top of the Mahnleejae Hill (from Dowha to Dongjah). Consequently, due to the ping pong phenomena, many calls are dropped.

Adjustment: the inter-MSC hard handoff is changed from (Dowha $\alpha \rightarrow$ Dongjah $\tau$) to (Dowha $\alpha \rightarrow$ Ah-Hyun $\beta$) by adjusting the signal strength.

The Tx_ATTEN of the Ah-Hyun $\beta$ is changed from 150 to 190, and the antenna tilt of the Dowha $\beta$ is adjusted by 5 degrees downward. Result: the probability of success of the inter-MSC hard handoff reached 90%.

OPTIMIZATION EXAMPLE 4

Sep. 29, 1997; Hansol PCS BTS Between the Dongkyo and the Hapjeong in Seoul

Target: the shadow area in the Keuk-dong Broadcasting Station along the Wawoosahn way, and the shadow area in the crossroads near the Seokyo Garden on the Dongkyo street.

Adjustment: the tilt of the Dongkyo $\beta$ antenna is adjusted by 3 degrees downward. The antenna direction is adjusted 10 degrees toward the street.

The Dongkyo $\beta$ toward the street is strengthened, and the shadow area in the Keuk-dong Broadcasting Station and the crossroads near the Seokyo Garden on the Dongkyo street is to be solved. Result: the probability of success of the inter-MSC hard handoff reached 83%.

OPTIMIZATION EXAMPLE 5

Example of an inter-MSC Hard Handoff in a Tunnel

An optimization example (Sep. 26, 1997, Hansol PCS, Nahmsan $3^{rd}$ Tunnel) Refer to FIG. 5. There exists a shadow area in the Nahmsan $3^{rd}$ Tunnel running from Choongmooro (NID=11) to Yongsan (NID=3) having a distance of 1.3 Km.

Solution: As shown in FIG. 5, the transmitting antenna of the Yongsan BTS $\alpha$ is changed from 0 degrees to 4 degrees. Result: the probability of success of the inter-MSC hard handoff reached 100% in Oct. 1, 1997.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for optimizing hard handoffs in a Code Division Multiple Access (CDMA) network, comprising the steps of:

setting up preliminary conditions for a hard handoff test;

performing idle handoff tests in a hard handoff area;

analyzing log data of said idle handoff tests and making adjustments to base station communication equipment accordingly;

performing hard handoff tests in a traffic state in said hard handoff area;

analyzing log data of said hard handoff tests and making further adjustments to said base station communication equipment if hard handoff performance during said hard handoff tests is determined to be unsatisfactory; and performing a hard handoff confirmation test in said hard handoff area following said further adjustments.

2. The method of claim 1 wherein said hard handoff tests comprise a plurality of hard handoffs performed between Mobile Switching Centers.

3. The method of claim 1 wherein said adjustments to said base station equipment include adjustments to a base station antenna beam in azimuth and elevation to improve signal strength in the hard handoff area.

4. The method of claim 1 wherein the step of setting up preliminary conditions comprises the steps of:

setting a serving cell and a target cell between which said hard handoffs are to be performed;

establishing a route of a test vehicle carrying a mobile station involved in said hard handoff tests;

checking radio frequency (RF) parameters;

checking system parameters; and setting an optimization tool.

5. The method of claim 4 wherein said RF parameters include information about antenna beam direction and tilt of a base station antenna.

6. The method of claim 4 wherein said system parameters include handoff parameters (T_ADD, T_DROP, T_COMP, T_TDROP), guard timer, and guard level.

7. The method of claim 4 wherein said step of checking system parameters includes:
   receiving, by a mobile station involved in said handoff tests, a list of neighboring base stations provided from a base station manager;
   said mobile station determining whether said serving cell and said target cell are omitted from said list; and
   said mobile station checking the state of the cluster of the base station of said target cell via said base station manager.

8. The method of claim 4 wherein said step of setting an optimization tool comprises the steps of:
   inputting a pseudo random noise (PN) offset value to a Mobile Diagnostic Monitor (MDM);
   determining mobile station parameters; and
   obtaining a test cluster map.

9. The method of claim 8, wherein said step of determining mobile station parameters comprises determining an Electronic Serial Number, a vocoder rate and a class band of the mobile station under test.

10. The method of claim 1, wherein said step of performing idle handoff tests comprises performing a plurality of idle handoffs in said test area in opposite directions.

11. The method of claim 10, further comprising determining, based on said idle handoff tests, if a receiving level in said hard handoff area during said idle handoff tests is maintained in the range of about −75 to −80 dBm, and making adjustments to said base station equipment if said receiving level is not maintained.

12. The method of claim 1, further comprising determining, based on said idle handoff tests, whether a pilot to interference ratio of a forward link is below a first threshold, whether mobile receiving power of said forward link is below a second threshold, and whether mobile transmitting power is below a third threshold, and making adjustments to a base station antenna beam or base station transmit power if the respective parameters are below any of said first, second or third thresholds.

13. The method of claim 1 wherein said adjustments to said base station equipment include adjustments to base station transmit power to improve signal strength in the hard handoff area.

14. The method of claim 1 wherein said step of performing hard handoff tests includes performing a plurality of hard handoff tests in each of opposite directions in said hard handoff test area to generate statistics for successful and unsuccessful hard handoffs.

15. The method as set forth in claim 1, wherein signal strength of a serving cell enabling said hard handoffs to be performed under an optimized condition, is in the range of −10 to −7 dBm.

* * * * *